United States Patent
Carlson et al.

(10) Patent No.: US 10,163,219 B2
(45) Date of Patent: Dec. 25, 2018

(54) MACHINE VISION CARGO MONITORING IN A VEHICLE

(71) Applicants: Justin W Carlson, Commerce Township, MI (US); Philip Mallinger, Shelby Township, MI (US)

(72) Inventors: Justin W Carlson, Commerce Township, MI (US); Philip Mallinger, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/191,718

(22) Filed: Jun. 24, 2016

(65) Prior Publication Data

US 2017/0372484 A1    Dec. 28, 2017

(51) Int. Cl.
| | |
|---|---|
| *G06T 7/223* | (2017.01) |
| *B60R 1/00* | (2006.01) |
| *G08B 21/18* | (2006.01) |
| *G06K 9/20* | (2006.01) |
| *G06K 9/00* | (2006.01) |

(Continued)

(52) U.S. Cl.
CPC .............. *G06T 7/223* (2017.01); *B60R 1/00* (2013.01); *B60R 11/04* (2013.01); *G06K 9/00791* (2013.01); *G06K 9/2081* (2013.01); *G06T 7/254* (2017.01); *G06T 7/262* (2017.01); *G08B 21/18* (2013.01); *B60R 2300/70* (2013.01);
(Continued)

(58) Field of Classification Search
CPC ......... B60R 5/04; B60R 7/02; B60R 25/1004; B60R 2011/0036; B60R 2011/004; B60R 21/01538; B60R 2300/8066; B60R 2300/8006; B60R 2300/802; B60R 2300/60; B60R 2300/303; B60R 2025/1013; B60R 1/00; B62D 25/087; G06K 2017/0045; G06K 9/00832; G06K 9/00771; G06K 9/00624; G06K 9/00791; G06K 9/00838; G06K 9/2081; G06T 7/20; G06T 7/70; G06T 7/97; G06T 7/00; G06T 7/254; G06T 2207/30268; G06T 2207/30252; G06T 2207/30232; G08B 21/18
See application file for complete search history.

(56) References Cited

U.S. PATENT DOCUMENTS

| | | | |
|---|---|---|---|
| 6,970,588 B1 * | 11/2005 | Komatsu .............. | G06K 9/6253 356/237.1 |
| 2002/0172286 A1 * | 11/2002 | Ohki ..................... | H04N 5/145 375/240.16 |

(Continued)

FOREIGN PATENT DOCUMENTS

CN            203793211 U    *    8/2014

OTHER PUBLICATIONS

Translated Version of CN 203793211.*

(Continued)

*Primary Examiner* — Carol Wang
(74) *Attorney, Agent, or Firm* — Ralph E. Smith (57) ABSTRACT

A cargo position tracking routine implemented in an electronic control unit of an automotive vehicle uses machine vision to monitor the position of cargo in a cargo area of an automotive vehicle and determine whether the cargo has shifted. Upon determining that the cargo has shifted, the cargo position tracking routine causes a driver of the vehicle to be alerted.

4 Claims, 6 Drawing Sheets

(51) Int. Cl.
*G06T 7/254* (2017.01)
*G06T 7/262* (2017.01)
*B60R 11/04* (2006.01)

(52) U.S. Cl.
CPC .............. *G06T 2207/30232* (2013.01); *G06T 2207/30252* (2013.01)

(56) References Cited

U.S. PATENT DOCUMENTS

| | | | |
|---|---|---|---|
| 2004/0125217 A1 | 7/2004 | Jesson et al. | |
| 2005/0151838 A1* | 7/2005 | Fujita | G06T 1/00 348/39 |
| 2007/0183763 A1* | 8/2007 | Barnes | G01C 21/20 396/55 |
| 2011/0252131 A1* | 10/2011 | Karaoguz | H04L 41/12 709/224 |
| 2012/0113260 A1* | 5/2012 | Schofield | B60N 2/002 348/148 |
| 2013/0038759 A1* | 2/2013 | Jo | H04N 5/2256 348/240.99 |
| 2013/0251194 A1* | 9/2013 | Schamp | G06T 7/11 382/103 |
| 2013/0343640 A1* | 12/2013 | Buehler | B25J 9/0087 382/155 |
| 2014/0071279 A1 | 3/2014 | Mokashi et al. | |
| 2016/0297361 A1* | 10/2016 | Drazan | H04N 7/181 |
| 2016/0332535 A1* | 11/2016 | Bradley | B60N 2/002 |

OTHER PUBLICATIONS

"Land Rover Demonstrate Pioneering See Through Trailer Research—Unravel Travel TV," YouTube website video (m:44s) observed at <https://www.youtube.com/watch?v=URRIE_yrFF8> on Sep. 1, 2015. Website indicated video added to website on Sep. 1, 2015 by YouTube user "Unravel Travel TV."

* cited by examiner

MACHINE VISION CARGO MONITORING IN A VEHICLE

The present invention relates to a method of cargo monitoring in a vehicle to determine if the cargo has shifted.

BACKGROUND

Certain automotive vehicles have areas in which cargo can be stowed, referred to herein as a "cargo area" in the singular and as "cargo areas" the plural. Such a cargo area includes by way of example and not of limitation a bed of a truck such as a commercial truck or a pickup truck or a rear portion of a cabin of a van, sport utility vehicle, or other motor vehicle having an area in which cargo can be stowed, such as where passenger seats can be removed or laid flat.

During transit, cargo will sometimes shift in the cargo area of the vehicle, even though it may have been secured such as by being tied down. In some cases, it is desirable that the cargo remain in the position that it is stowed and that if it shifts that it be returned to its original position and resecured. In some cases, an occupant of the vehicle transporting cargo, such as the driver, visually observes the cargo on occasion to see if it has shifted. In this regard, some vehicles have cameras that are positioned to see the cargo area and a vehicle occupant can occasionally view on a display the image from the camera to see if the cargo has shifted. In other cases, a mirror is positioned to see the cargo area and a vehicle occupant can occasionally view the image in the mirror to see if the cargo has shifted. In either case, an occupant of the vehicle needs to periodically look at the image of the cargo area to see if the cargo has shifted. If the cargo shifts, the vehicle occupant would thus not be aware that the cargo has shifted until the next time the vehicle occupant observes the image of the cargo on the display (from the camera) or in the mirror.

SUMMARY

In accordance with an aspect of the present disclosure, an automotive vehicle and method of monitoring a position of cargo in a cargo area of the automotive vehicle and determining of the cargo is shifted is provided. The automotive vehicle has an electronic control unit to which a camera positioned to see the cargo area is coupled. A display is coupled to the electronic control unit. The electronic control unit is configured to periodically receive a cargo area image of the cargo area from the camera and determine whether a current cargo image in a current cargo area image has moved with respect to a prior cargo image in a prior cargo area image. The electronic control unit is configured to determine that the cargo has shifted upon determining that the cargo image has moved with respect to the prior cargo image. The electronic control unit configured to activate an alert upon determining that the cargo has shifted.

In an aspect, wherein the electronic control unit is configured to: determine a position of an initial cargo image in an initial cargo area image and set this position as a baseline cargo image position; determine a position of the current cargo image in the current cargo area image; and determine that the current cargo image has moved with respect to the prior cargo image if the position of the current cargo image in the current cargo area image has shifted from the baseline cargo image position.

In an aspect, the electronic control unit is configured to define edges of the initial cargo image and display on the display the initial cargo image with the defined edges highlighted and prompt for an input selecting the highlighted edges and upon receiving the input selecting the highlighted edges as selected edges and set the baseline cargo image position as an area in the initial cargo area image defined by the selected edges.

In an aspect, the electronic control unit is configured to display an initial cargo image on the display and prompt for a user input touching on the display a center of a cargo image in the initial cargo image and then search outwardly from the center until it encounters edges of the cargo image. It then sets the base line cargo image position as an area in the initial cargo area image defined by these encountered edges of the cargo image.

In an aspect, the electronic control unit is configured to prompt on the display for a user input selecting an area in an initial cargo area image and setting an area selected by a user as a baseline area, and determine that the current cargo image has moved with respect to the prior cargo image if the current cargo image has moved in the baseline area relative to the prior cargo image.

BRIEF DESCRIPTION OF THE DRAWINGS

The present invention will become more fully understood from the detailed description and the accompanying drawings, wherein.

DETAILED DESCRIPTION

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

In accordance with an aspect of the present disclosure, a cargo position tracking routine implemented in an electronic control unit of an automotive vehicle uses machine vision to monitor the position of cargo in a cargo area of an automotive vehicle and determine whether the cargo has shifted. Upon determining that the cargo has shifted, the cargo position tracking routine causes a driver of the vehicle to be alerted.

Figure 1A:
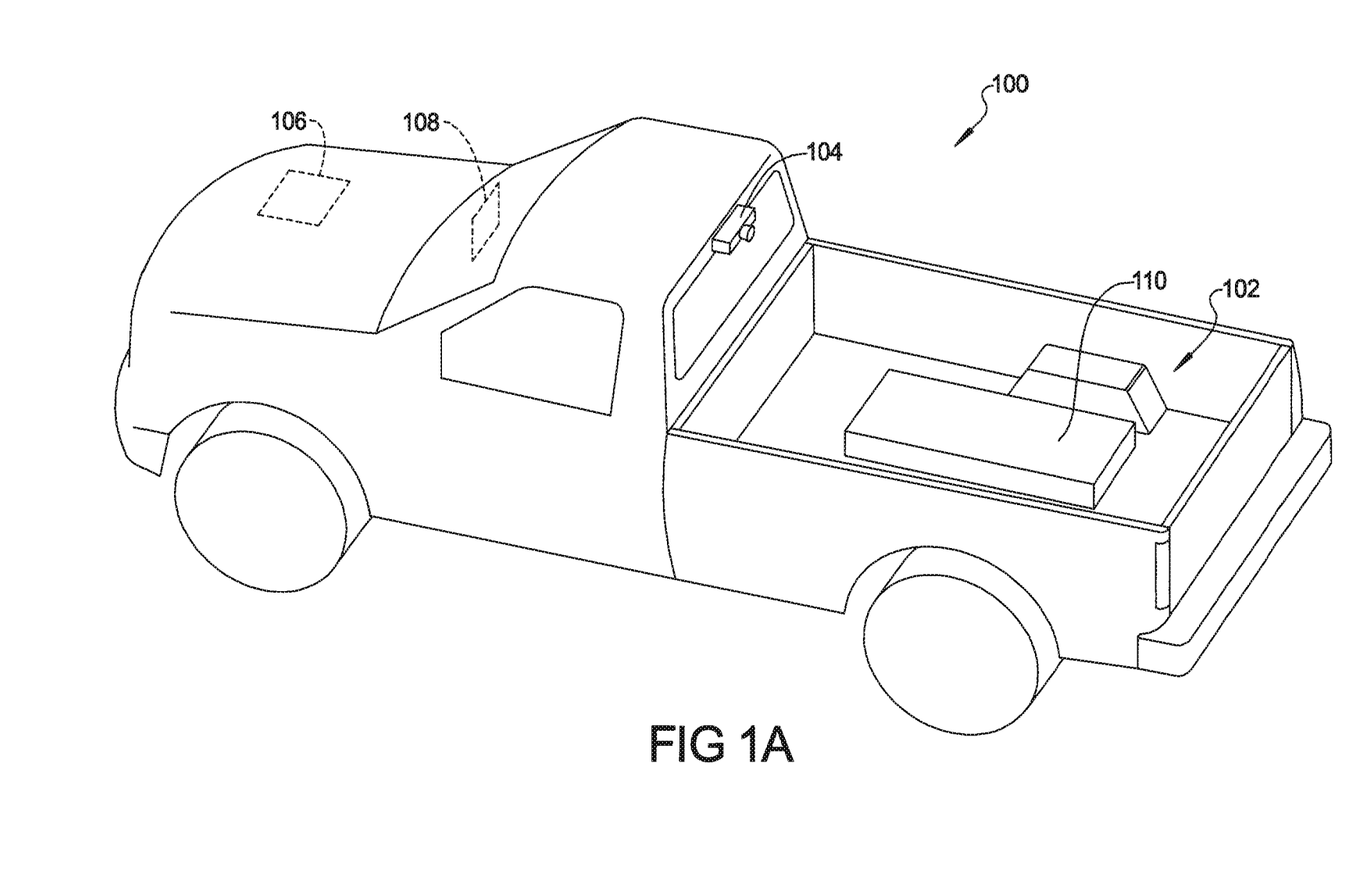
FIG. 1A is a simplified block diagram of an automotive vehicle having automatic cargo shift detection in accordance with an aspect of the present disclosure.

FIG. 1A is a simplified block diagram of an automotive vehicle 100 having automatic cargo shift detection in accordance with an aspect of the present disclosure. Vehicle 100 has a cargo area 102, a camera 104 positioned to see the cargo area 102, an electronic control unit 106 to which camera 104 is coupled and a display 108 coupled to electronic control unit 106. In an aspect, images from camera 104 are received by control unit 106 that uses them to determine whether cargo 110 in cargo area 102 has shifted, as discussed in more detail below. In an aspect, control unit 106 displays the images from camera 104 on display 108. In an aspect, camera 104 is also coupled to display 108 which displays the images from camera 104. In an aspect, display 108 is a display of a component of vehicle 100 such as a head of an infotainment system or an instrument cluster. It should be understood that the images from camera 104 can be a series of still images or a series of video frames.

In an aspect, electronic control unit 106 is configured with control logic to determine if cargo 110 has shifted. In an aspect, this control logic includes of edge detection image processing and in another aspect, this control logic includes optical flow estimation image processing. As is known in the art of machine vision and image processing, edge detection is an image processing technique for finding the boundaries of objects within images. It works by detecting discontinuities in brightness. That is, an edge of an object in an image is detected when there is a sufficient discontinuity in brightness between adjacent segments in the image. Common edge detection techniques include Sobel, Canny, Prewitt, Roberts, and fuzzy logic methods. Also as known in the art, optical flow is the distribution of the apparent velocities of objects in an image. In general, moving objects that are closer to the camera will display more apparent motion than distance objects that are moving at the same speed. Optical flow estimate is often used in machine vision to characterize and quantify the motion of objects in a video stream, often for motion-based object detection and tracking systems. Common optical flow techniques include the Horn-Schunk method and the Lucas-Kanade algorithm.

Figure 1B:
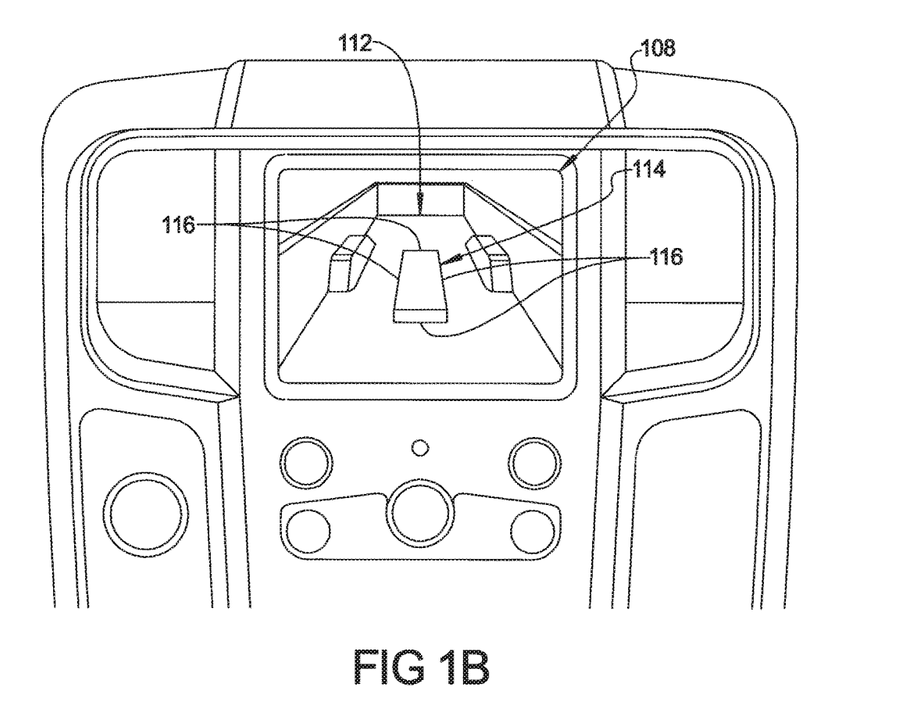
FIG. 1B is a perspective view of a display of the automotive vehicle of FIG. 1A.
Figure 2:
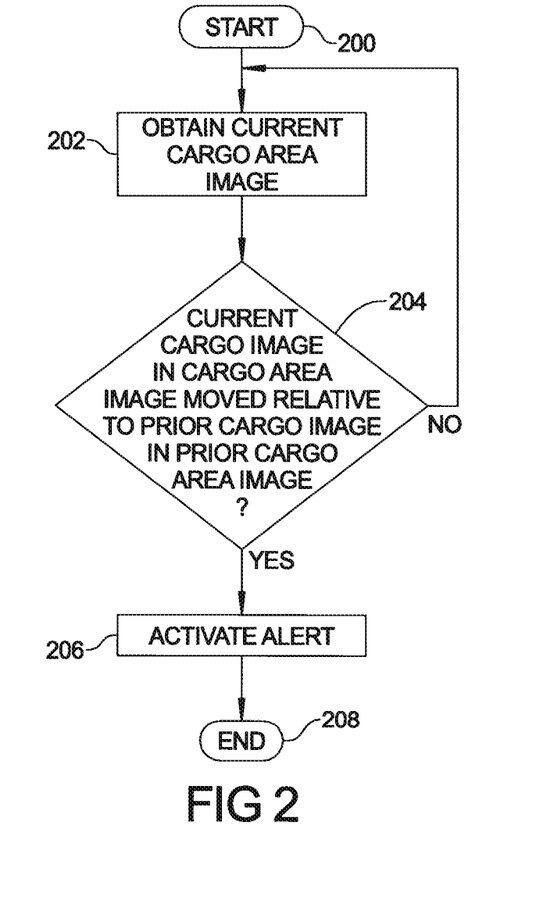
FIG. 2 is a flow chart of an illustrative cargo position tracking routine to detect whether cargo has shifted in accordance with an aspect of the present disclosure.

FIG. 2 is a flow chart of an illustrative cargo position tracking routine implemented in control logic in electronic control unit 106 to detect whether cargo 110 has shifted in accordance with an aspect of the present disclosure. The cargo position tracking routine starts at 200. At 202, the cargo tracking routine periodically causes an image of cargo area 102 to be acquired by camera 104 and provided to electronic control unit 106 which receives the cargo area image from camera 104. This image is referred to herein as the cargo area image 112 (FIG. 1B). If cargo 110 is present, an image of cargo 110 will be included as part of the cargo area image 300 and this image of cargo 110 will be referred to herein as the cargo image 114 (FIG. 1B). At 206, the cargo tracking routine checks whether a current cargo image 114 in a current cargo area image 112 has moved relative to a prior cargo image 114 in a prior cargo area image 112. If the current cargo area image 114 has moved relative to the prior cargo image 114, the cargo tracking control routine proceeds to 210 where it causes an alert to be activated, for example, an alert provided to a driver of the vehicle, such as by displaying an alert on display 108, and/or causing an audible alert to be sounded. The cargo tracking routine then proceeds to 212 where it ends. If at 206 the current cargo image did not move relative to the prior cargo image, the cargo tracking routine branches back to 204.

Figure 3:
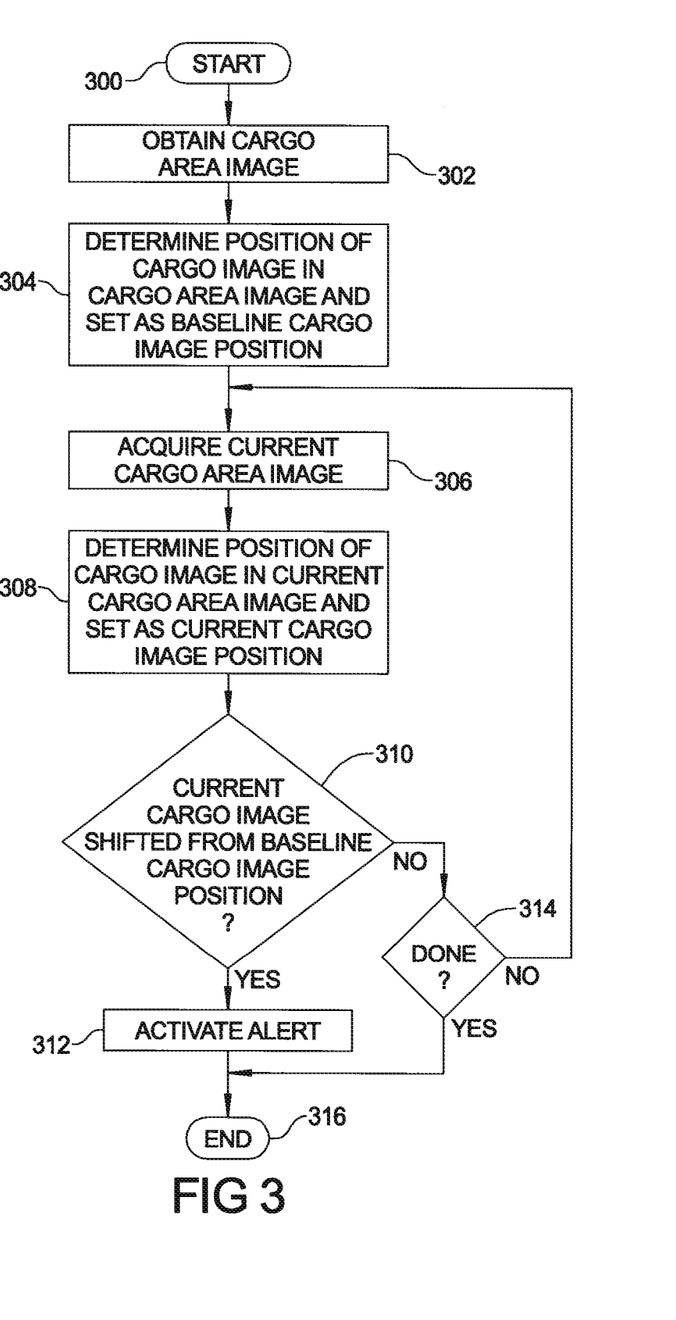
FIG. 3 is a flow chart of an illustrative cargo position tracking routine to detect whether cargo has shifted in which edge detection is utilized to define the position of a cargo image in a cargo area image in accordance with an aspect of the present disclosure.

FIG. 3 is a flow chart of an illustrative cargo position tracking routine implemented in control logic in electronic control unit 106 to detect whether cargo 110 has shifted in which edge detection is utilized to define the position of a cargo image in a cargo area image in accordance with an aspect of the present disclosure. At 300 the cargo tracking routine starts. At 302, the cargo tracking routine causes cargo area image 112 to be acquired by camera 104 and provided to electronic control unit 106 which receives this cargo area image from camera 104. At 304, the cargo tracking routine determines the position of cargo image 114 in cargo area image 112 and sets this as the baseline cargo image position. At 306, the cargo tracking routine causes a current cargo area image 112 to be acquired by camera 104 and provided to electronic control unit 106 which receives this cargo area image from camera 104. At 308, the cargo tracking routine determines a position of cargo image 114 in the current cargo area image 112, this position of cargo image 114 referred to herein as the current cargo image position. In an aspect, cargo position tracking routine does this automatically and in another aspect uses a user prompt as discussed below with reference to FIG. 4. At 310, the cargo tracking routine determines whether the current cargo image 114 in the current cargo area image 112 has moved relative to the prior cargo image 114 by determining whether the current cargo image position has shifted from the baseline cargo image position. Illustratively, the cargo tracking routine uses edge detection or optical flow to determine if the current cargo image position has shifted from the baseline cargo image position. If the current cargo image position has shifted from the baseline cargo image position, the cargo tracking routine proceeds to 312 where it causes an alert to be activated, for example, an alert provided to a driver of the vehicle, such as by displaying an alert on display 108, and/or causing an audible alert to be sounded, or the like. The cargo tracking routine then proceeds to 316 where it ends. If at 310 the cargo tracking routine determined that the current cargo image position has not shifted from the baseline cargo image position, the cargo tracking routine branches to 314 where determines whether to end monitoring of the position of cargo 110 in cargo area 102, such as due to a driver having turned cargo tracking off, the vehicle having been turned off, or other input indicating that cargo tracking should be turned off.

If at 314 the cargo tracking routine determined that cargo tracking is to be turned off, the cargo tracking routine proceeds to 216 where it ends. If at 314 the cargo tracking routine determined that cargo tracking is not to be turned off, it branches back to 308.

Figure 4:
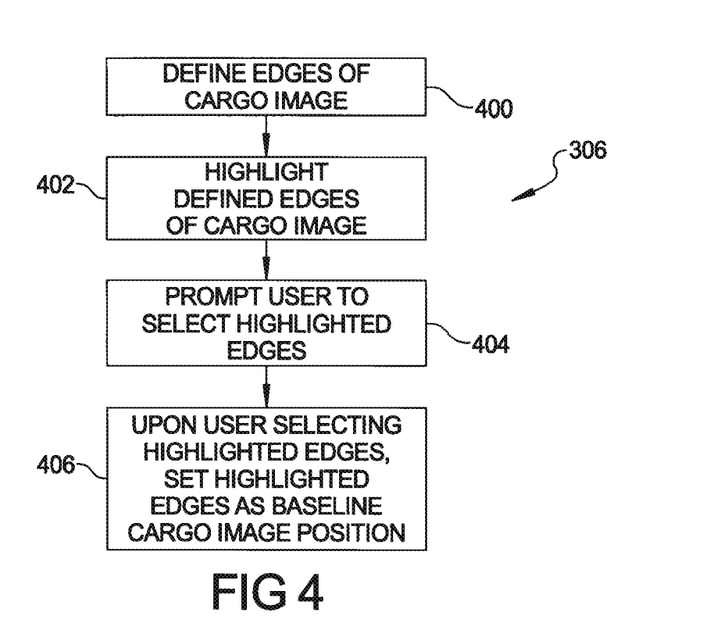
FIG. 4 is a flow chart showing in more detail an example of how the cargo tracking routine of FIG. 3 determines a baseline cargo image position.

FIG. 4 is a flow chart showing in more detail an example for block 306 of how the cargo tracking routine determines the baseline cargo image position. At 400, the cargo tracking routine performs edge detection on the cargo area image 112 (FIG. 1B) to define edges 116 (FIG. 1B) of the cargo area image 112. At 402, the cargo tracking routine highlights the defined edges 116. At 404, the cargo tracking routine prompts the driver of the vehicle to select the highlighted edges 116. At 406 in response to the driver selecting the highlighted edges, the cargo tracking routine sets the baseline cargo image position as the area in the cargo area image 112 defined by the selected highlighted edges 116 of the cargo image 114.

Figure 5:
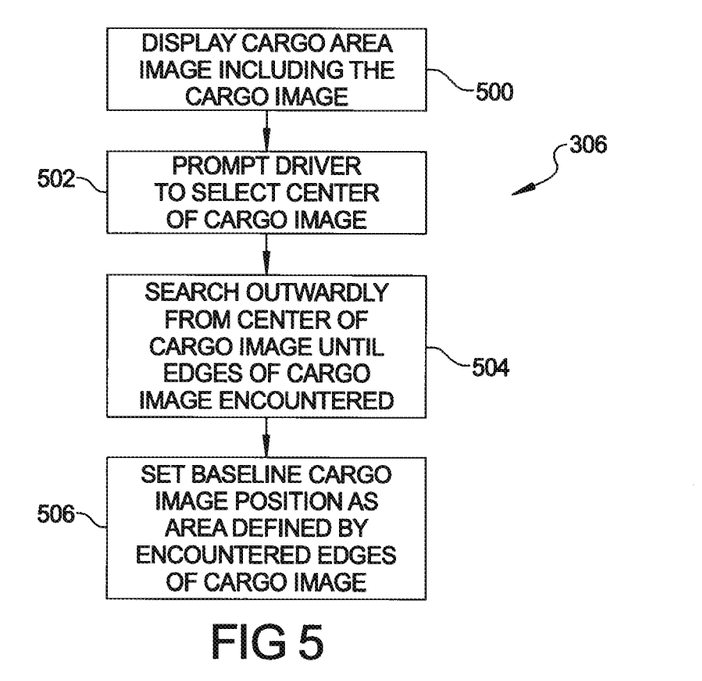
FIG. 5 is a flow chart showing in more detail another example of how the cargo tracking routine of FIG. 3 determines a baseline cargo image position.

FIG. 5 is a flow chart showing in more detail another example for block 306 of how the cargo tracking routine determines the baseline cargo image position. At 500, the cargo tracking routine displays on display 108 the cargo area image 112 including the cargo image 114. At 502, the cargo tracking routine 108 prompts a user to select a center of the cargo image 114 by touching the center of cargo image 114 on the display 108. At 504, the cargo tracking routine searches outwardly from the center of cargo image 114 until it encounters edges 116 of cargo image 114. At 506, the cargo tracking routine sets the baseline cargo image position as the area in the cargo area image 112 defined by these encountered edges 116 of cargo image 114.

Figure 6:
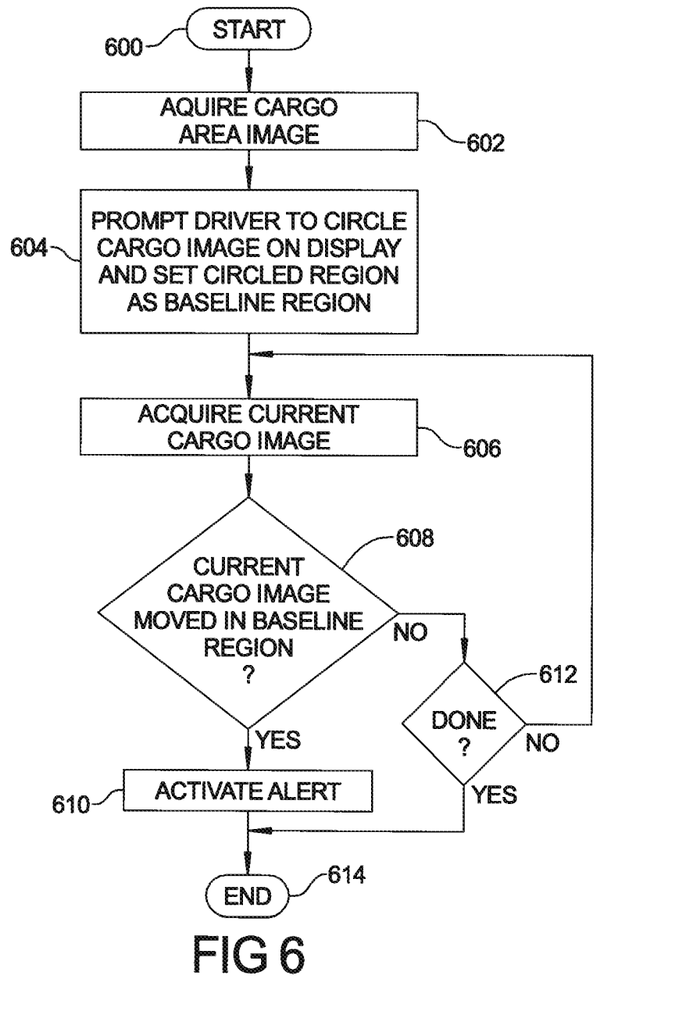
FIG. 6 is a flow chart of another illustrative cargo tracking routine to detect whether cargo has shifted in which optical flow is utilized to determine whether a cargo image has moved within a user defined region.

FIG. 6 is a flow chart of another illustrative cargo tracking routine implemented in control logic in electronic control unit 106 to detect whether cargo 110 has shifted in which optical flow is utilized to determine whether cargo image 114 has moved within a user defined region. The cargo tracking routine starts at 600. At 602, the cargo tracking routine causes cargo area image 112 to be acquired by camera 104 and provided to electronic control unit 106 which receives the cargo area image 112 from camera 104. At 604, the cargo position tracking routine prompts a user to circle the cargo image 114 on display 108 and sets the circled region as the baseline region. At 606, the cargo position tracking routine causes the current cargo area image 112 to be acquired by camera 104 and provided to electronic control unit 106. At 608, the cargo position tracking routine determines whether the current cargo image 114 in the current cargo area image 112 has moved relative to the prior cargo image 114 by determining whether the current cargo image 114 has moved within the baseline region relative to the prior current cargo image 114, such as by using optical flow. If at 608 the cargo image 114 has moved within the baseline region, the cargo position tracking routine proceeds to 610 where it causes an alert to be provided to a driver of the vehicle, such as by displaying an alert on display 108, and/or causing an audible alert to be sounded, or the like. The cargo position tracking routine then proceeds to 614 where it ends. If at 608 the cargo tracking routine determined that the current cargo image 114 has not moved within the baseline region, it branches to 612 where it determines whether to end monitoring of the position of cargo 110 in cargo area 102, such as due to a driver having turned cargo tracking off, the vehicle having been turned off, or other input indicating that cargo tracking should be turned off. If at 612 the cargo position tracking routine determined that cargo tracking is to be turned off, the cargo tracking routine proceeds to 614 where it ends. If at 612 the cargo tracking routine determined that cargo tracking is not to be turned off, it branches back to 608.

The electronic control unit such as electronic control unit 106 in which any of the above cargo position tracking routines are implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that the electronic control unit 106 or any of the cargo tracking control routines implemented in electronic control unit 106 performs a function or is configured to perform a function, it should be understood that the electronic control unit 106 is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of monitoring a position of cargo in a cargo area of an automotive vehicle and determining if the cargo has shifted, the automotive vehicle including an electronic control unit to which a camera positioned to see the cargo area is coupled and a display coupled to the electronic control unit, the method comprising:

defining, with the electronic control unit, edges of an initial cargo image and having the electronic control unit display, on the display, the initial cargo image with the defined edges highlighted and prompting for an input selecting the highlighted edges and upon receiving the input selecting the highlighted edges as selected edges, setting with the electronic control unit a baseline cargo image position as an area in the initial cargo image defined by the selected edges;

periodically receiving with the electronic control unit a cargo area image of the cargo area from the camera and determining whether a current cargo image in a current cargo area image has moved with respect to the baseline cargo image position;

determining with the electronic control unit that the cargo has shifted upon determining with the electronic control unit that the current cargo image has moved with respect to the baseline cargo image position; and having the electronic control unit activate an alert upon determining that the cargo has shifted.

2. A method of monitoring a position of cargo in a cargo area of an automotive vehicle and determining if the cargo has shifted, the automotive vehicle including an electronic control unit to which a camera positioned to see the cargo area is coupled and a display coupled to the electronic control unit, the method comprising:

having the electronic control unit display, on the display, an initial cargo area image including an initial cargo image:

prompting a user with the electronic control unit to touch, on the display, a center of the initial cargo image;

having the electronic control unit search outwardly from the center of the initial cargo image until it encounters edges of the initial cargo image;

having the electronic control unit set a baseline cargo image position as an area in the initial cargo area image defined by the encountered edges of the initial cargo image;

periodically receiving with the electronic control unit a cargo area image of the cargo area from the camera and determining whether a current cargo image in a current cargo area image has moved with respect to the baseline cargo image position;

determining with the electronic control unit that the cargo has shifted upon determining with the electronic control unit that the current cargo image has moved with respect to the baseline cargo image position; and having the electronic control unit activate an alert upon determining that the cargo has shifted.

3. An automotive vehicle, comprising:

a cargo area;

an electronic control unit to which a camera positioned to see the cargo area is coupled;

a display coupled to the electronic control unit;

wherein the electronic control unit is configured to define edges of an initial cargo image and display, on the display, the initial cargo image with the defined edges highlighted and prompt for an input selecting the highlighted edges and upon receiving the input selecting the highlighted edges as selected edges, setting a baseline cargo image position as an area in the initial cargo image defined by the selected edges;

the electronic control unit configured to periodically receive a cargo area image of the cargo area from the camera and determine whether a current cargo image in a current cargo area image has moved with respect to the baseline cargo image position;

the electronic control unit configured to determine that cargo in the cargo area has shifted upon determining that the current cargo image has moved with respect to the baseline cargo image position; and the electronic control unit configured to activate an alert upon determining that the cargo has shifted.

4. An automotive vehicle, comprising:

a cargo area;

an electronic control unit to which a camera positioned to see the cargo area is coupled;

a display coupled to the electronic control unit;

wherein the electronic control unit is configured to:
   display, on the display, an initial cargo area image including an initial cargo image;
   prompt a user to touch, on the display, a center of the initial cargo image;
   search outwardly from the center of the initial cargo image until it encounters edges of the initial cargo image; and
   set a baseline cargo image position as an area in the initial cargo area image defined by the encountered edges of the initial cargo image;

the electronic control unit configured to periodically receive a cargo area image of the cargo area from the camera and determine whether a current cargo image in a current cargo area image has moved with respect to the baseline cargo image position;

the electronic control unit configured to determine that cargo in the cargo area has shifted upon determining that the current cargo image has moved with respect to the baseline cargo image position; and the electronic control unit configured to activate an alert upon determining that the cargo has shifted.

* * * * *